United States Patent [19]

King

[11] Patent Number: 5,220,366
[45] Date of Patent: Jun. 15, 1993

[54] MESSAGE RECEIVING DATA BACK FOR CAMERA

[75] Inventor: Jack N. King, Davidson, N.C.

[73] Assignee: Camera World, Inc., Charlotte, N.C.

[21] Appl. No.: 803,015

[22] Filed: Dec. 5, 1991

[51] Int. Cl.$^5$ .............................................. G03B 29/00
[52] U.S. Cl. .................................. 354/76; 340/825.44
[58] Field of Search .................. 354/75, 76, 105, 106; 340/311.1, 825.44

[56] References Cited

U.S. PATENT DOCUMENTS

| | | | |
|---|---|---|---|
| 4,143,956 | 3/1979 | Miyagawa | 354/106 |
| 4,814,763 | 3/1989 | Nelson et al. | 340/825.44 |
| 5,153,582 | 10/1992 | Davis | 340/825.44 |
| 5,155,513 | 10/1992 | Mutsumura et al. | 354/106 |

OTHER PUBLICATIONS

Ricoh—Owner's Manual for DB-5M, pp. 1-28.

Primary Examiner—Michael L. Gellner
Assistant Examiner—Howard B. Blankenship
Attorney, Agent, or Firm—Bell, Seltzer, Park & Gibson

[57] ABSTRACT

A camera data back incorporates a message receiver or personal pager. The data back comprises a housing with a front and back face, a message receiver within the housing, and means within the housing for placing data onto an image recording media through the back face. The received message is displayed to the camera user by a display on the front face of the housing. An electronic controller is electrically connected to the data placing means, the message receiver, and the display, for controlling the data placing means in order to place data onto the image recording media, and for controlling the display to display the messages received by the message receiver.

17 Claims, 3 Drawing Sheets

MESSAGE RECEIVING DATA BACK FOR CAMERA

FIELD OF THE INVENTION

This invention relates to photography, and more particularly to data backs for reproducing data directly onto camera film when the film is being exposed to take a picture.

BACKGROUND OF THE INVENTION

Data backs, well known to those skilled in the art, are camera back housings which automatically place the date, time, and in some instances other data directly onto a frame of camera film when the film is being exposed to take a picture. The date and time are continuously updated once the data back is initialized to the proper time period. Such data backs are widely used to help a photographer in identifying and billing work done by minimizing date and time errors.

The data back components usually consist of a display indicating the time and date to the camera user, an optical system which typically passes light from the time/date display to be focussed onto part of a film frame to be exposed, and a control mechanism for adjusting the time and date automatically. The construction and operation of a typical data back is described in U.S. Pat. No. 4,143,956 to Miyagawa entitled Camera with Date Entry. Data backs are also commercially available such as RICOH model no. DB-5M.

Data backs are typically used by people who take many pictures, e.g., professional photographers. A professional photographer needs to carry many accessories to efficiently perform his work, including film, lights, personal pagers (message receivers), carrying cases, and camera mounts or tripods. Unfortunately, in the haste of work, these accessories often get lost, misplaced, or damaged. The many accessories are also difficult for the photographer to handle all at once.

SUMMARY OF THE INVENTION

It is therefore an object of the present invention to provide an improved camera data back.

It is another object of the present invention to provide a data back which reduces the number of accessories which a photographer needs to carry.

These and other objects are provided according to the present invention, by incorporating a pager or message receiver into a data back. A camera accessory according to the present invention comprises a housing in the form of a camera back panel, which includes means for receiving messages and means for exposing data onto camera film, to provide a combined data back and message receiving device.

Preferably, the data back and pager share electronic components to provide a low cost data back/pager. In particular, the data back includes means for exposing data such as date, time, or various messages onto film within a camera. The data back also includes means for receiving transmitted message signals and means for displaying the message signals to the camera user. It also includes an electronic controller which is preferably electrically connected to the exposing and displaying means in order to expose data onto the camera film and to display the received messages and data on the displaying means. Thus, the electronic controller controls the data back and pager functions, and a single display may be used to display data and messages. A single set of switches or keys may also provide user input for the data back and pager.

DESCRIPTION OF A PREFERRED EMBODIMENT

The present invention now will be described more fully hereinafter with reference to the accompanying drawings in which a preferred embodiment of the invention is shown. This invention may, however, be embodied in many different forms and should not be construed as limited to the embodiment set forth herein; rather, this embodiment is provided so that this disclosure will be thorough and complete and will fully convey the scope of the invention to those skilled in the art. Like numbers refer to like elements throughout.

Figure 1:
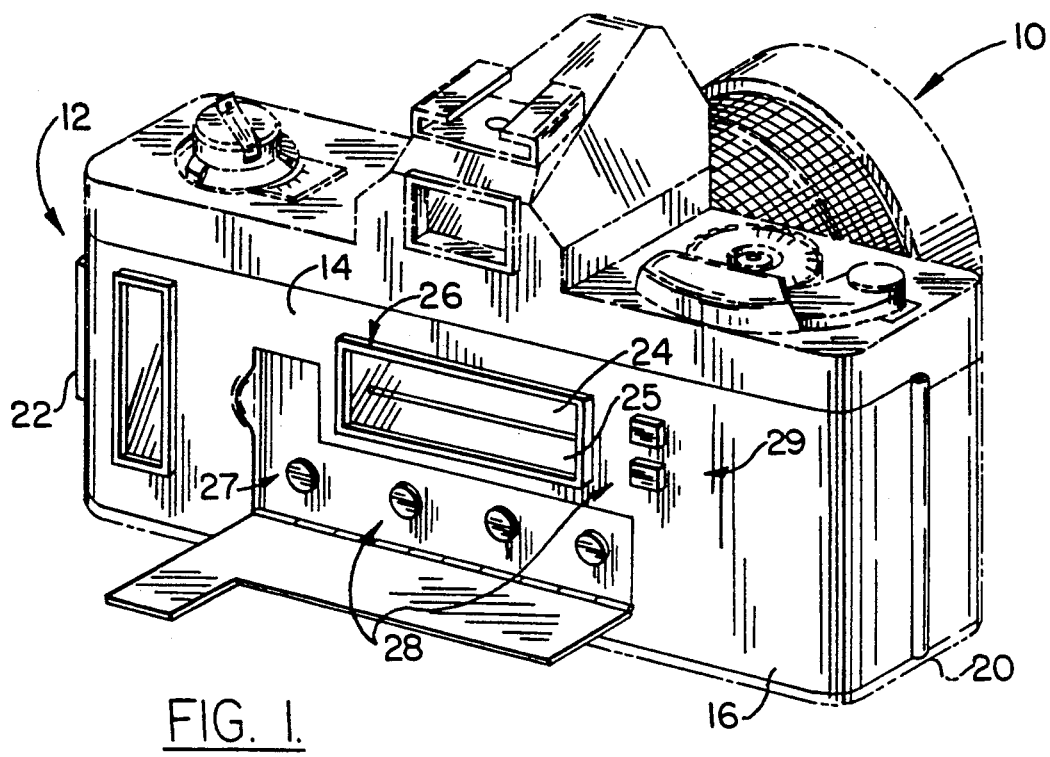
FIG. 1 schematically illustrates a front perspective view of a camera including a data back according to the present invention.

Referring now to FIG. 1, there is illustrated a message receiving data back 12 for a camera 10 in accordance with this invention. Data back 12 has a housing 14 with a front face 16. The housing 14 adaptively connects to the camera 10 via a hinge 20 and a fastener 22 or other well known means.

Figure 2:
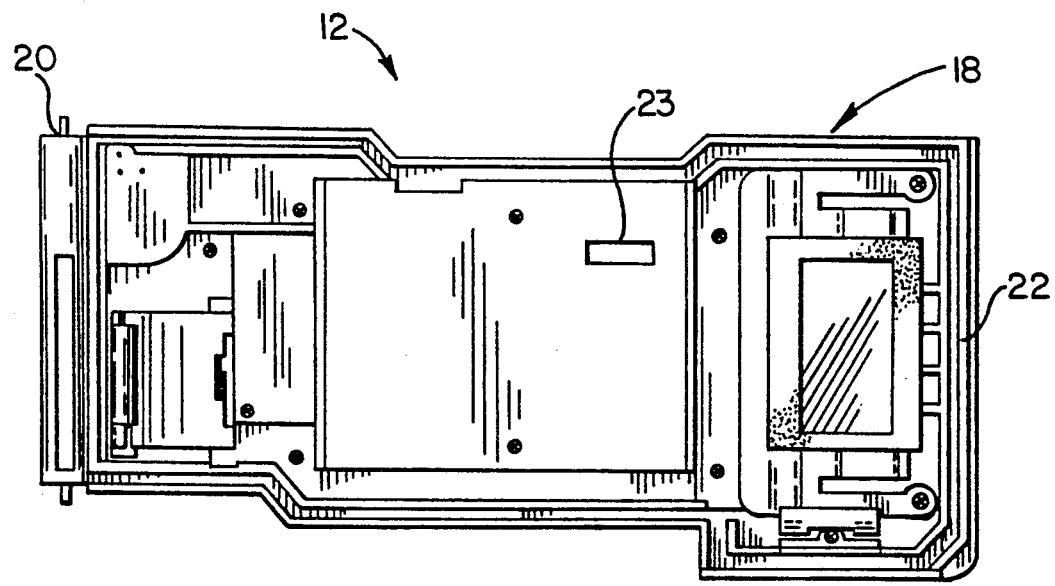
FIG. 2 schematically illustrates a back view of a data back according to the present invention.

Referring to FIG. 2, the back face 18 of the data back 12 flushably engages with the camera film. The back face 18 has a data placing device 23 for placing data, such as date and time, onto the camera film. The front face 16, in FIG. 1, has a display 26 for displaying data to the camera user. The display has two display lines 24, 25. Display line 24 displays the data to be placed on the camera film. This data typically will include information such as date and time. Display line 2 displays the message received via an antenna and pager built into the data back.

The front face 16 also has one or more switches 28 for resetting the pager's beeper and for adjusting the data to be placed on the camera film. Switch 27 may be used to selectively adjust the data to be placed on the camera film. Switch 29, on the other hand, may be used to reset the pager's beeper and to acknowledge that a message has been received.

Figure 3:
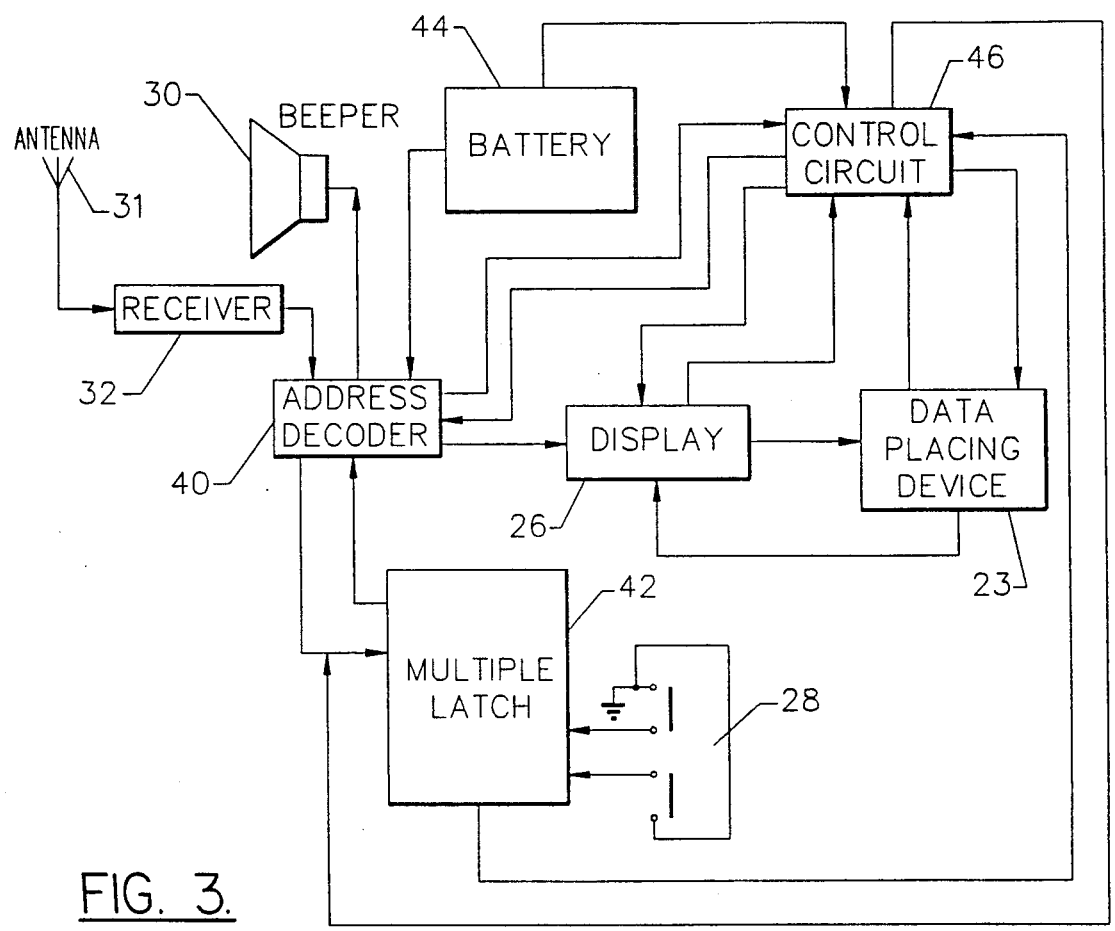
FIG. 3 is a block diagram of electronic circuitry for a data back according to the present invention.

Referring now to FIG. 3, there is illustrated a block diagram of the electronic circuitry for the data back 12 of the present invention. Antenna 31 receives transmitted messages via receiver 32. The message from the output of receiver 32 is electrically transmitted to an address decoder 40 for alerting the camera user that a message has been received via the beeper 30 and translating the message for the camera user to view. The camera user may reset the beeper 30 via the address decoder 40 by using the latch 42. The latch 42 is selectively adjusted using the switches 29 on the front face 16. The address decoder 40 converts the analog message to a digital message for digital transmission throughout the electrical network of FIG. 3. The address decoder 40 is powered by the battery 44.

Once the message is decoded in the address decoder 40, the message is sent to the display 26, as also seen in FIG. 1. If the message is a phone number or other data that the camera user wants exposed onto the camera film, then the message is electrically sent to the control circuit 46 of FIG. 3 via the address decoder 40. The control circuit 46 sends data to both the display 26 and the data placing device 23. The control circuit 46, like the address decoder 40, is also electrically activated by the battery 44. The data placing device 23 places the data, such as date, time, or messages onto a frame of camera film when the camera user takes the picture.

Figure 4:
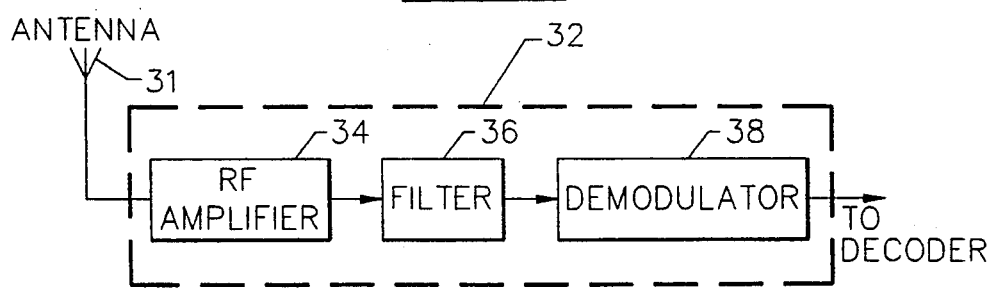
FIG. 4 is a block diagram of an alternative embodiment of electronic circuitry for a data back with acknowledge back capability according to the present invention.

Referring now to FIG. 4, there is illustrated a block diagram of the receiver 32. The receiver 32 comprises of a radio frequency (RF) amplifier 34 for amplifying the received RF signal from the antenna 31. The RF amplifier 34 is electrically connected to a filter 36. The filter 36 reduces the RF noise in the transmitted signal. The filter 36, in turn, is electrically connected to a demodulator 38. The demodulator 38 receives the RF signal from the filter 36 and extracts the message from the RF signal.

Figure 5:
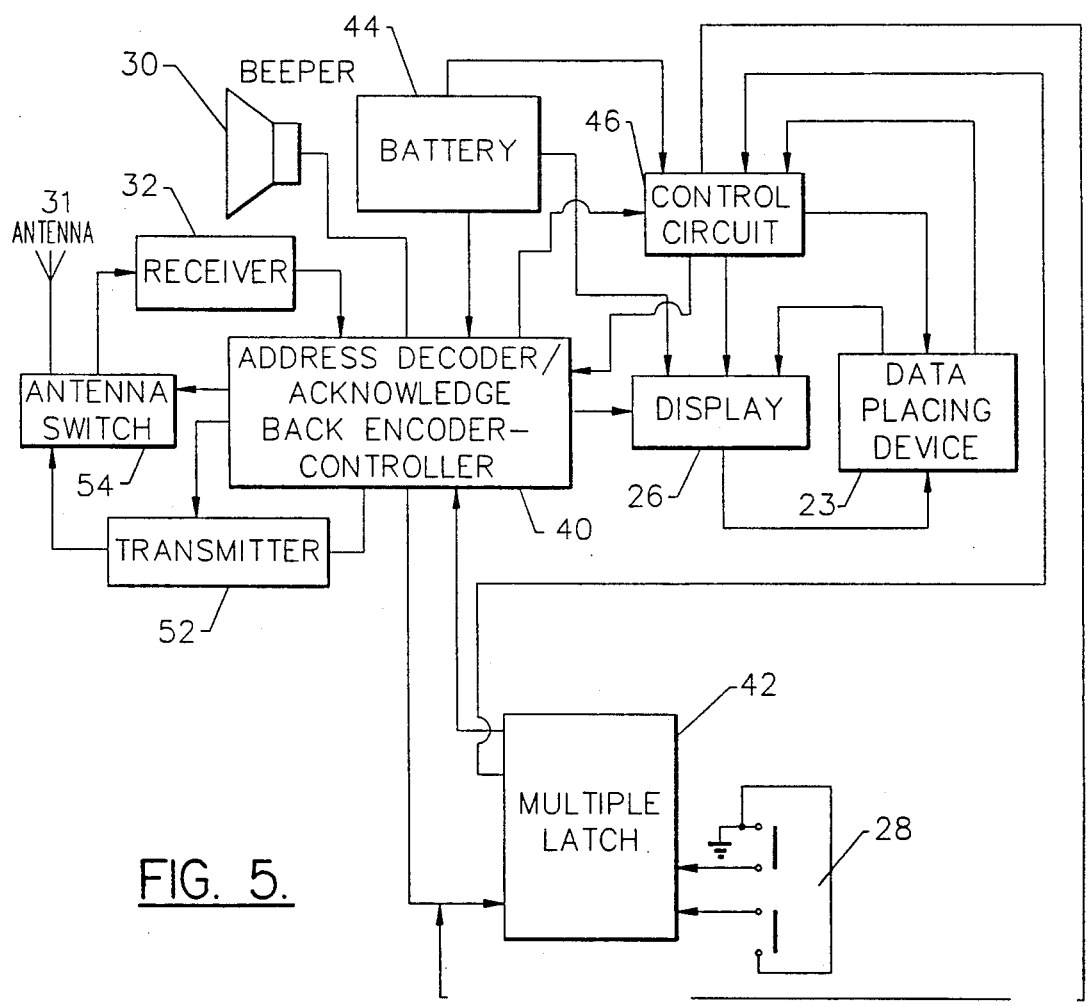
FIG. 5 is a block diagram of electronic circuitry for the message receiver of FIGS. 3 and 4.

Referring now to FIG. 5, according to another aspect of the invention, a transmitter 52 with an antenna switch 54 is also included for sending acknowledgment messages to the original message sender. The camera user will also use the switches 28 for electrically sending an acknowledgment message to the address decoder 40. The address decoder 40 then modulates the signal and electrically sends the signal to the transmitter 52. The antenna switch 54 electrically activates to send the acknowledgment message to the original message sender and resets to receive messages for the receiver 32.

The detailed construction and operation of data backs are well known and are illustrated, for example, in U.S. Pat. No. 4,143,956 to Miyagawa entitled Camera with Date Entry. Pagers are, likewise, well known and are illustrated, for example, in U.S. Pat. No. 4,814,763 entitled Paging Terminal Apparatus with Page Forwarding Capability and Methodology Thereof. Accordingly, additional details need not be described herein.

It is also understood by those having skill in the art that although the invention has been described with respect to a still camera, it may also be so used with other image recording devices such as video cameras, video recorders, and the like, using film, magnetic tape or other recording media.

In the drawings and specification, there have been disclosed typical preferred embodiments of the invention and, although specific terms are employed, they are used in a generic and descriptive sense only and not for the purposes of limitation, the scope of the invention being set forth in the following claims.

That which is claimed is:

1. A camera accessory comprising:
a housing;
means for attaching said housing to a camera;
means carried by said housing for placing data onto a photographic image recording media in the camera; and
paging means carried by said housing for receiving message signals
to thereby provide a combined databack and pager.

2. The camera accessory according to claim 1 wherein said data placing means is electrically connected to said paging means.

3. The camera accessory according to claim 1 wherein said housing has a front face and a back face, and wherein said attaching means attaches said housing to said camera such that said back face faces inside said camera and said front face faces outside said camera; wherein said placing means places data through said back face onto said photographic image recording media; and wherein said paging means includes means, on said front face, for displaying received message signals.

4. The camera accessory according to claim 3 wherein said data placing means comprises optical means for placing data onto said photographic image recording media.

5. The camera accessory according to claim 3 wherein said front face further comprises means for accepting user commands for said paging means and said data placing means.

6. A camera accessory comprising:
means for placing data onto a photographic image recording media in a camera;
paging means for receiving transmitted message signals; and
electronic controlling means, electrically connected to said data placing and paging means, for controlling said data placing means to place data onto said photographic image recording media, and for controlling said paging means to receive said transmitted message signals.

7. The camera accessory according to claim 6 further comprising means, responsive to said electronic controlling means, for displaying said data and said message signals.

8. The camera accessory according to claim 6 further comprising means, electrically connected to said electronic controlling means, for accepting user commands for said paging means and said data placing means.

9. The camera accessory according to claim 6 wherein said data placing means comprises optical means for placing data onto said photographic image recording media.

10. The camera accessory according to claim 6 wherein said paging means comprises means for receiving radio frequency message signals.

11. The camera accessory according to claim 10 wherein said paging means for receiving radio frequency message signals comprises radio frequency antenna means, and means connected to said antenna means, for decoding message signals received thereby.

12. The camera accessory according to claim 6 further comprising transmitting means, responsive to said electronic controlling means, for acknowledging received messages.

13. The camera accessory according to claim 12 wherein said transmitting means comprises an antenna, means for decoding received messages from said antenna, and means for transmitting acknowledge messages over said antenna.

14. A photographic image recorder comprising:
a housing for containing a photographic recording media;
means for recording a photographic image onto said photographic recording media in said housing;
means for placing data onto said photographic recording media in said housing; and paging means for receiving transmitted message signals from a transmitter remote from the camera.

15. The image recorder according to claim 14 wherein said housing is further adapted to contain a battery power source, for providing electrical power to said optical means, said data placing means, and said paging means.

16. The camera accessory according to claim 6, further comprising means responsive to said electronic controlling means for displaying thereon the data and the message signals.

17. The camera accessory according to claim 14, further comprising means responsive to said electronic controlling means for displaying thereon the data and the message signals.

* * * * *